G. & H. KLAHRE.
ANCHOR BOLT.
APPLICATION FILED NOV. 16, 1907. RENEWED FEB. 5, 1909.
918,063.
Patented Apr. 13, 1909.
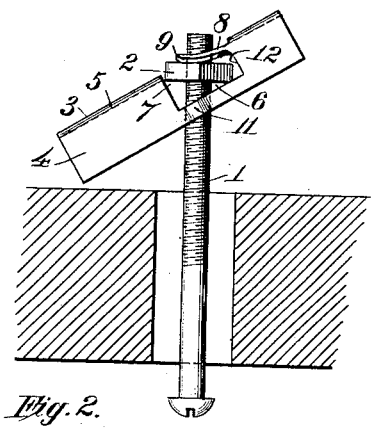
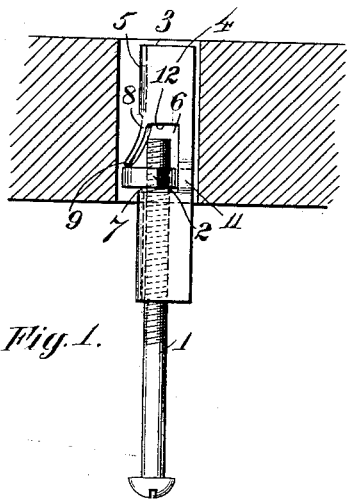
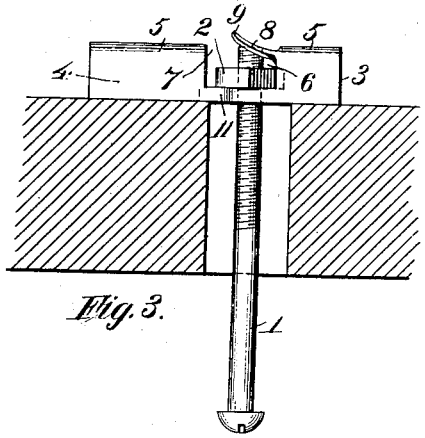
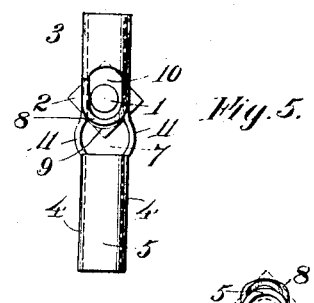
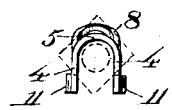
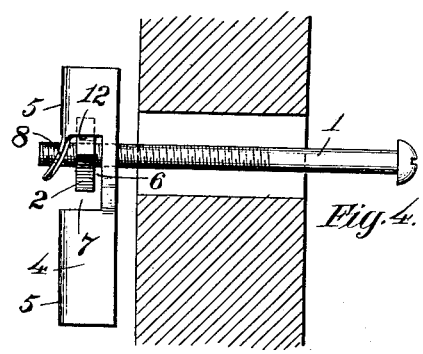
Witnesses:
H. S. Austin
A. A. Olson
Inventors:
Gustav Klahre
and Henry Klahre
by
Joshua R. H. Potts
Atty.

UNITED STATES PATENT OFFICE.

GUSTAV KLAHRE AND HENRY KLAHRE, OF CHICAGO, ILLINOIS.

ANCHOR-BOLT.

No. 918,063.   Specification of Letters Patent.   Patented April 13, 1909.

Application filed November 16, 1907, Serial No. 402,363. Renewed February 5, 1909. Serial No. 476,314.

*To all whom it may concern:*

Be it known that we, GUSTAV KLAHRE and HENRY KLAHRE, citizens of the United States, residing in Chicago, county of Cook, and State of Illinois, have invented certain new and useful Improvements in Anchor-Bolts, of which the following is a specification.

Our invention relates to anchor bolts and the object of our invention is to provide an anchor bolt which may be inserted through a hole in the wall or ceiling of but slightly greater size than required for the passage of the nut therethrough.

A further object of our invention is to provide an anchor block which may be readily and quickly applied to bolts of various sizes and of any stock form.

A further object of our invention is to provide an anchor bolt having an anchor block which will readily adjust itself after having been passed through a hole in either the wall or the ceiling.

A further object of our invention is to provide an anchor bolt which may be tightened without drawing back on the bolt as is necessary with those now on the market of which we are aware.

Other objects will appear hereinafter.

Our invention will be more readily understood by reference to the accompanying drawings forming a part of this specification and in which, Figure 1 is an elevation of an anchor bolt embodying our invention in its preferred form, and illustrating the same in the position it assumes in being passed through a hole in the ceiling, Fig. 2 is a view similar to Fig. 1 illustrating the position the block assumes after having passed through the hole, Fig. 3 is a similar view illustrating the block resting in position, Fig. 4 is a side elevation showing the position the block assumes after having been passed through a horizontal hole as through a wall, Fig. 5 is an end view of the bolt in the position shown in Fig. 4, and Fig. 6 is an end view of the block.

Referring to the drawings, 1 indicates a bolt of any ordinary or preferred form having the usual nut, 2. The anchor block comprises a member, U shaped in cross section and having parallel side walls which are but slightly wider apart than the diameter of the bolt. The walls are partially cut away to accommodate the nut when the block is either in alinement with the bolt or at right angles thereto and a tongue extends from one side of the cut away portion to prevent separation of the bolt and the block after having been assembled except by removing the bolt from the nut.

Referring again to the drawings, 3 indicates the anchor block. This comprises the parallel side walls, 4—4 and the curved base or connecting wall, 5 together forming a U shaped member as shown clearly in Fig. 6. The walls 4 and 5 are cut away forming a double L shaped aperture comprising a transverse portion 7 extending through the walls 4 and 5 and a longitudinal portion 6 in each of the side walls 4 at right angles to the portion 7. This leaves a portion of the wall 5 overhanging the portions 6 of the aperture forming a tongue 8. The portion 6 accommodates the nut 2 when in one or locking position, and the portion 7 accommodates the nut when the device is being passed through the hole in the wall or ceiling. When the block is turned into the position shown in Fig. 1, the bolt, 2 lies between the parallel walls, 4 and the distance between the walls 4, is preferably but slightly greater than the diameter of the bolt, to the end that the device may be inserted through a hole of minimum size. The end of the portion of the curved wall, 5 overhanging the aperture, 6, and forming a tongue, 8, rests upon the upper face of the nut, 2, when the device is being inserted through a hole in the ceiling. The tongue is bent slightly outward and as soon as the device passes above the ceiling it drops into the position shown in Fig. 2, the end, 9 acting as a pivot upon which the block swings. The bolt may then be dropped into the position shown in Fig. 3, where it may be left until ready for use. The tongue, 8 is provided with an aperture, 10 to receive the end of the bolt, 1 when being tightened. To better accommodate the nut, when the anchor block is in alinement with the bolt, the walls, 4, are slightly flared as at 11 opposite the aperture, 7 in the curved wall, 5.

The cut away portion or aperture, 6—7 is arranged to one side of the center of the block in order that one end of the block shall be considerably heavier than the other. This is particularly desirable when the device is being inserted through a hole in a side wall, as it permits the bolt to be tightened without drawing back thereon as is now necessary with anchor bolts of this class such as are on the market at present. The nut, 2 is arranged diagonally in the aperture portion, 7, and when the bolt is inserted through a hole in the wall, the block drops into the position shown in Fig. 4 with the nut arranged diagonally in the portion, 6, and the end of the walls, 12 of the aperture resting on the inclined sides of the nut, the bolt may then be tightened without being drawn back to bring the block in contact with the inner surface of the wall, as the unbalanced block will prevent the nut from turning as the bolt is screwed up.

It is obvious that a bolt of any ordinary or preferred construction can be used with the anchor block described, the size of the bolt being limited only by the distance between the walls, 4 and the recesses or apertures, 6 and 7. To apply the block to a bolt, the nut is placed diagonally within the aperture after which the bolt may be screwed thereinto. After the parts are assembled the nut is locked within the apertures in the block by the bolt.

Having described our invention what we claim as new and desire to secure by Letters Patent is:

1. An anchor bolt consisting in an ordinary bolt having the usual nut, in combination with an anchor block, said anchor block comprising a pair of parallel side walls and a curved connecting wall forming a member U shaped in cross section said side and connecting wall having a double L shaped aperture comprising a transverse portion in said curved wall and longitudinal portions in said side walls and adapted to receive the nut of the bolt when the block is both at right angles to the bolt and in alinement therewith, substantially as described.

2. An anchor block comprising a pair of parallel side walls and a curved connecting wall together forming a member having a U shaped cross section, said side and connecting walls being cut away to form an aperture to receive the nut of the bolt and a tongue extending over said aperture, substantially as described.

3. In an anchor bolt, an anchor block comprising a pair of parallel side walls and a curved connecting wall forming a member with a U shaped cross section, said side and connecting walls being cut away to form an aperture to receive the nut of a bolt and an apertured tongue overhanging said aperture, substantially as described.

4. In an anchor bolt, an anchor block comprising a pair of parallel side walls and a curved connecting wall forming a member with a U shaped cross section, said side and connecting walls being cut away to form an aperture to receive the nut of a bolt and an outwardly curved tongue extending from said curved wall and overhanging said aperture, substantially as described.

5. In an anchor bolt, an anchor block comprising a pair of parallel side walls and a curved connecting wall together forming a member having a U shaped cross section, each of said side walls being longitudinally apertured and said curved wall being transversely apertured and together forming a single double L shaped recess to receive the nut of a bolt, the portion of the side walls opposite the transverse portion of the recess or aperture being outwardly curved substantially as described.

In testimony whereof we have signed our names to this specification in the presence of two subscribing witnesses.

GUSTAV KLAHRE.
HENRY KLAHRE.

Witnesses:
LYDIA RINKENBERGER,
HELEN F. LILLIS.